United States Patent
Kunieda et al.

Patent Number: 5,907,898
Date of Patent: Jun. 1, 1999

[54] SECURING METHOD

[75] Inventors: Shigehiko Kunieda; Takeshi Shogo; Shuji Fujii, all of Nagoya, Japan

[73] Assignee: NGK Insulators, Ltd., Japan

[21] Appl. No.: 08/802,100

[22] Filed: Feb. 19, 1997

[30] Foreign Application Priority Data

Feb. 21, 1996 [JP] Japan ..................... 8-033679

[51] Int. Cl.$^6$ ................................. B21D 39/04
[52] U.S. Cl. ........................... 29/517; 29/407.08
[58] Field of Search ................. 29/517, 407.08, 29/407.05, 515, 516

[56] References Cited

U.S. PATENT DOCUMENTS 2,728,343 12/1955 Everett ......................... 29/517

Primary Examiner—Carl E. Hall
Attorney, Agent, or Firm—Parkhurst & Wendel, LLP

[57] ABSTRACT

A securing method including the steps of inserting a core into a depression portion of a metal member having an open end portion, and connecting the metal member to the core by compressing circumferentially the core and metal member by means of a compression die is disclosed. The improvement includes a step of compressing circumferentially the core and metal member in such a manner that an overall compression portion to be compressed by means of the compression die is divided into a plurality of compression regions arranged from the open end portion of the metal member to the other end portion, and a compression pressure is applied to the compression regions successively from the open end portion to the other end portion 5 Claims, 4 Drawing Sheets

FIG_1
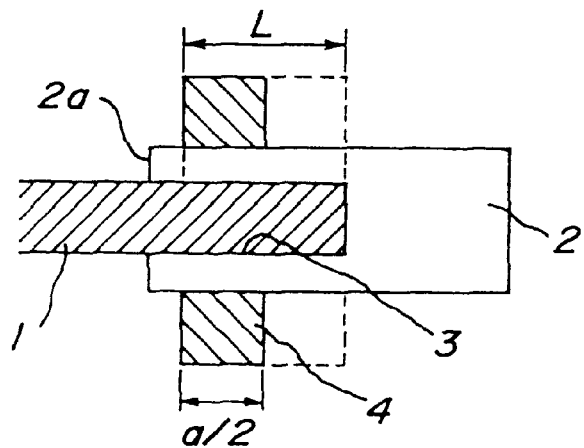
FIG_2
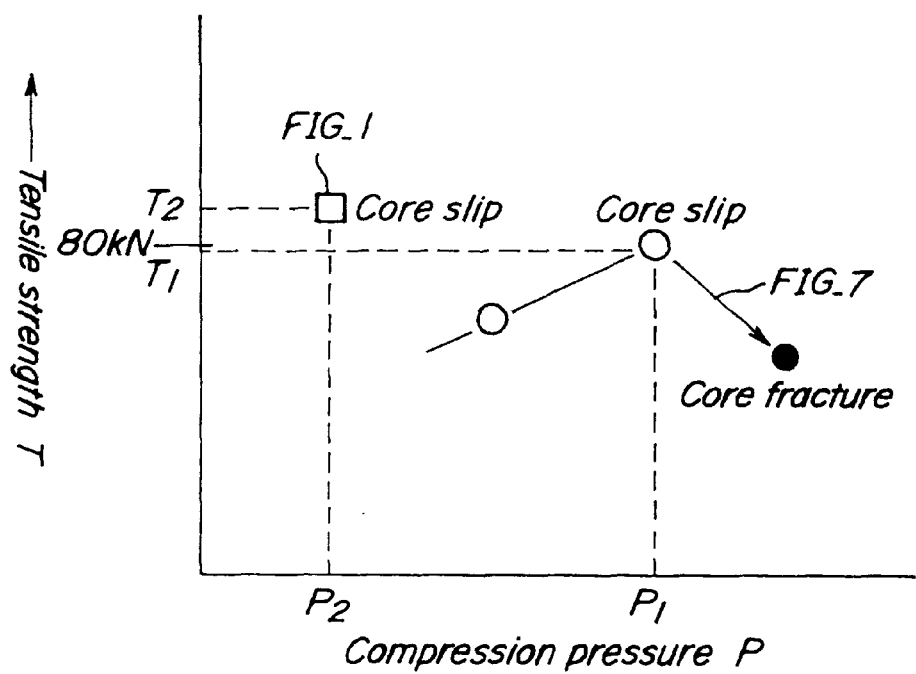

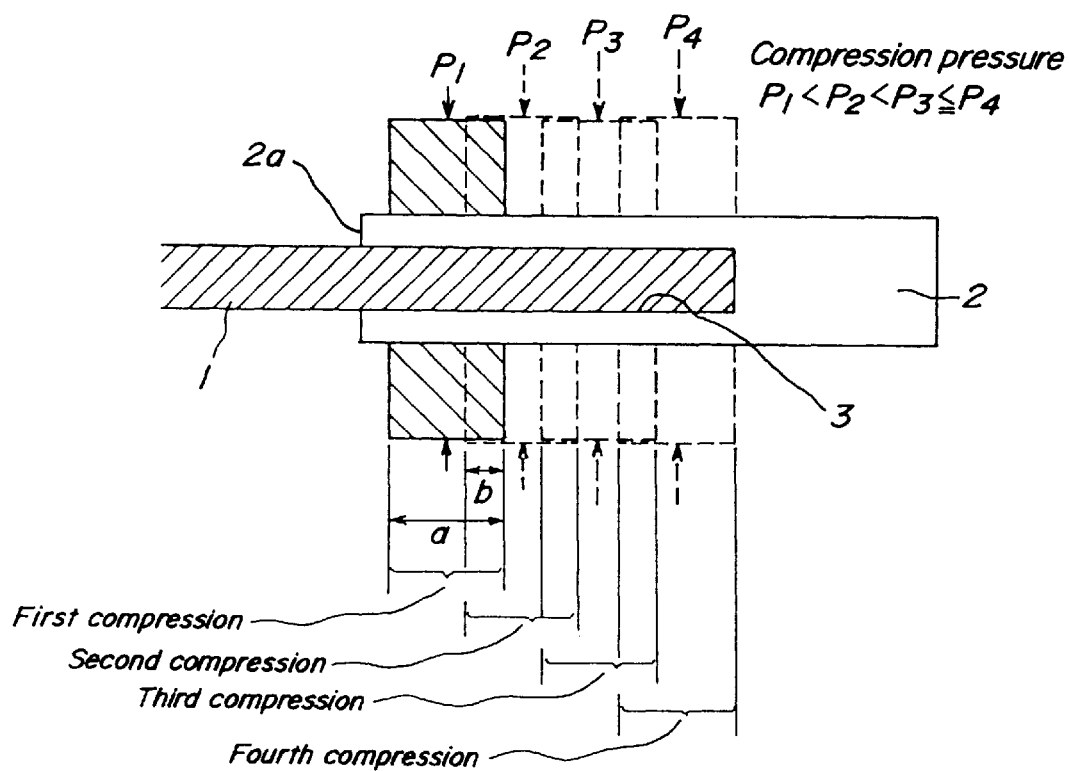

FIG_6
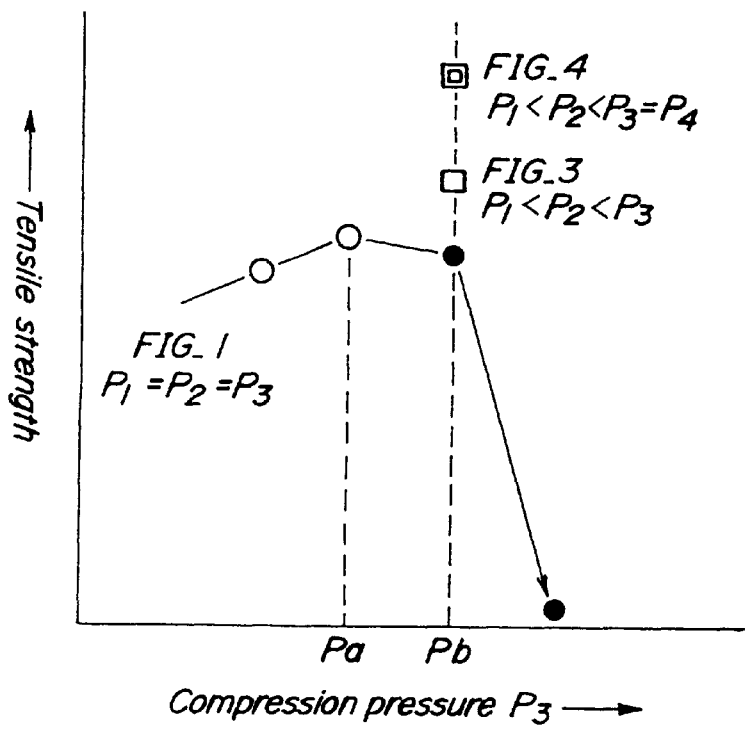
FIG_7
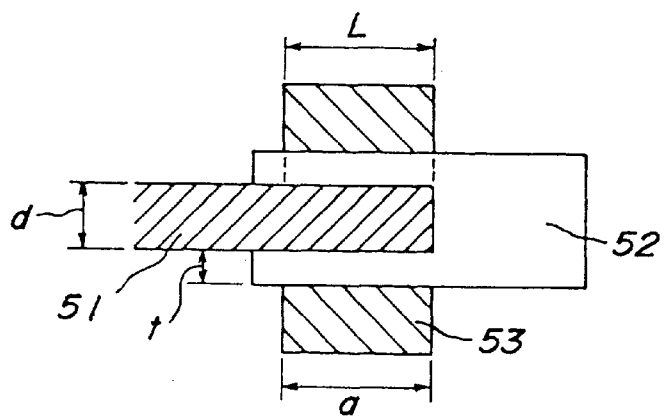

SECURING METHOD

BACKGROUND OF THE INVENTION

(1) Field of the Invention

The present invention relates to a securing method for inserting a core into a depression portion of a metal member having an open end and connecting the metal member to the core by compressing circumferentially the core and metal member by means of a compression die, and especially relates to a securing method used preferably for a connection between a core and a metal end-fitting in a polymer insulator.

(2) Related Art Statement

Generally, various securing methods for inserting a core into a depression portion of a metal member having an open end and connecting the metal member to the core by compressing circumferentially the core and metal member by means of a compression die have been known. For example, Japanese Patent Publication No.60-54730 discloses, as shown in FIG. 7, such a technique that a core 51 and a compression portion of a metal member 52 are connected by performing a compression operation such that a compression pressure P is circumferentially applied to a compression region L of the core 51 and the metal member 52 to be compressed at once by means of a compression die 53 having a width a corresponding to the compression region L.

In this technique, since the metal member 52 is deformed plastically in a direction vertical to a direction in which the compression pressure is applied by means of the compression die 53, a tensile pressure is applied to the core 51 in its axial direction. Moreover, a compression pressure is applied to the core 51 in its radial direction at the same time.

At the time when use is made of the technique disclosed in Japanese Patent Publication No.60-54730, a sufficient securing strength can be obtained by this technique. However, recently for example in a field of a polymer insulator and so on, there arises a requirement such that a securing method having a more sufficient securing strength is provided so as to produce a polymer insulator having better reliability.

In this respect, the compression pressure may be increased so as to obtain a more sufficient securing strength. However, a predetermined securing strength can not be obtained if a material of the core is varied, and thus there arises a problem such that a securing portion is fractured at an extremely low tensile strength in an actual use.

SUMMARY OF THE INVENTION

An object of the invention is to eliminate the drawbacks mentioned above and to provide a securing method which can obtain a more sufficient securing strength (tensile strength) in the case that a core and a metal member are connected by compressing them by means of a compression die.

According to the invention, a securing method for inserting a core into a depression portion of a metal member having an open end and connecting the metal member to the core by compressing circumferentially the core and metal member by means of a compression die, comprises a step of compressing circumferentially the core and the metal member in such a manner that an overall compression portion to be compressed by means of the compression die is divided into a plurality of compression regions arranged from the open end portion of the metal member to the other end portion, and a compression pressure is applied to the compression regions successively from the open end portion to the other end portion.

In the present invention, in the case of performing a connection by compressing circumferentially the core and metal member by means of the compression die, since a compression pressure is applied to the compression regions successively from the open end portion to the other end portion, it is possible to obtain a high securing strength (tensile strength) as compared with a connection by compressing them at once.

BRIEF DESCRIPTION OF THE DRAWINGS

FIG. 1 is a schematic view for explaining one embodiment of a securing method according to the invention;

FIG. 2 is a graph for comparing the securing method according to the invention and the known securing method;

FIG. 5 is a schematic view for explaining still another embodiment of the securing method according to the invention;

FIG. 6 is a graph for explaining a preferable embodiment of the securing method according to the invention; and FIG. 7 is a schematic view for explaining one embodiment of a known securing method.

DESCRIPTION OF THE PREFERRED EMBODIMENTS

Figure 3:
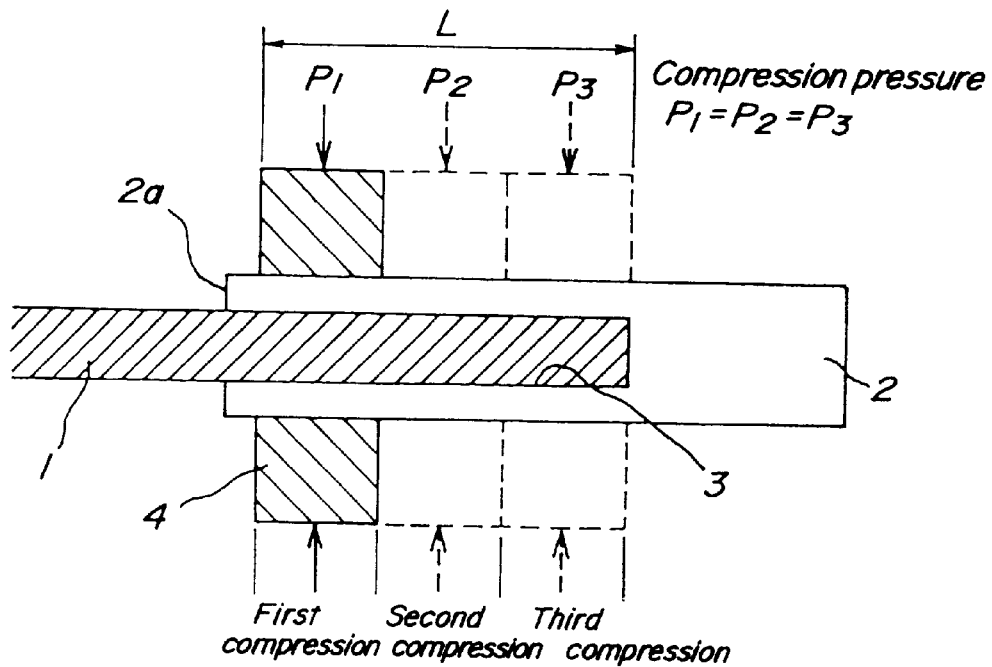
FIG. 3 is a schematic view for explaining another embodiment of the securing method according to the invention.

At first, a connection performed by compressing a core and a metal member, which is a base of a securing method according to the invention, will be explained with reference to a compression connection between an FRP core and a metal end-fitting in a polymer insulator. In the polymer insulator, a connection strength is generated by a friction of a boundary surface between the FRP core and the metal end-fitting. Therefore, in the polymer insulator in which a connection between the FRP core and the metal end-fitting is performed by a compression method, a fracture strength and a fracture mode are varied in accordance with a compression pressure applied when the connection is performed.

In the case that the FRP core and the metal end-fitting are connected by a compression method in a region where a low compression pressure is applied, the fracture mode becomes "core slip-out" mode in which a slip occurs at a boundary surface between the FRP core and the metal end-fitting and the FRP core is slipped out of the metal end-fitting, if the polymer insulator is maintained in a tensile state in an actual use. In this case, if the compression pressure is increased, a limit fracture strength, at which the core slip-out starts, is also increased. However, if they are connected under a compression pressure which is beyond a predetermined limit, the fracture mode becomes "core fracture" mode in which a tensile strength at which the polymer insulator can be endured is decreased unexpectedly. That is to say, in the "core fracture" mode, when a compression connection between the FRP core and the metal end-fitting is performed, micro cracks are generated in the FRP core. In this case, if the polymer insulator is maintained in a tensile state for a long time in an actual use, the micro cracks generated in the FRP core are propagated, and the FRP core is fractured. Therefore, a tensile strength at which the polymer insulator can be endured is decreased unexpectedly. Moreover, if the compression pressure is further increased, the FRP core is fractured in the metal end-fitting, and a sufficient connection strength can not be obtained.

FIG. 1 is a schematic view for explaining one embodiment of a securing method according to the invention with reference to a securing method at an end portion of the polymer insulator. In the embodiment shown in FIG. 1, an FRP core 1 is inserted into a depression portion 3 of a metal end-fitting 2 having an open end 2a, and the FRP core 1 and the metal end-fitting 2 are connected by being circumferentially compressed by means of a compression die 4. In this case, in the present invention, a width of the compression die 4 is set to a width a (L/2) which is a half of an overall compression portion L, and a compression pressure is applied to the overall compression portion at two times from a side of the open end 2a. Respective compression pressure applying operation is performed in such a manner that a compression pressure P is applied to an overall outer surface of the metal end-fitting 2.

Hereinafter, the securing method according to the invention shown in FIG. 1 and the known securing method shown in FIG. 7 are compared. That is to say, as shown in FIG. 7, the known polymer insulator, obtained by applying a compression pressure P once thereto under such a condition that a diameter d of the FRP core 51 is 16 mm and a width a of the compression die 53 is 44 mm which is equal to that of the overall compression portion L, is prepared. At the same time, as shown in FIG. 1, the polymer insulator according to the invention, obtained by applying a compression pressure twice thereto under such a condition that a diameter of the FRP core 1 is 16 mm and a width a of the compression die 4 is 22 mm which is a half of the overall compression portion L, is prepared.

Then, with respect to the thus prepared polymer insulator according to the invention and the thus prepared known polymer insulator, tensile strengths at which the polymer insulator is fractured are measured and a fracture mode at that time is confirmed. The results are shown in FIG. 2. From the results shown in FIG. 2, it is understood that, in the known polymer insulator, if a tensile strength endurable in the actual use is increased by forming the polymer insulator under an increased compression pressure P, the largest tensile strength, at which the polymer insulator is fractured in the core slip-out mode, is T1 at the compression pressure P1. On the other hand, it is understood that, in the polymer insulator according to the invention, if a compression pressure to be applied is P2 which is extremely lower than P1, a tensile strength T2 which is larger than T1 is obtained in the core slip-out mode. In this manner, if the overall compression portion is divided into a plurality of compression regions and a compression pressure is applied to the compression regions successively to perform a connection, a tensile stress and a compression stress generated in the core can be decreased, and a fracture of the core in the metal member due to a compression of the metal member can be prevented, so that the polymer insulator having a stable tensile strength characteristic can be obtained.

Figure 4:
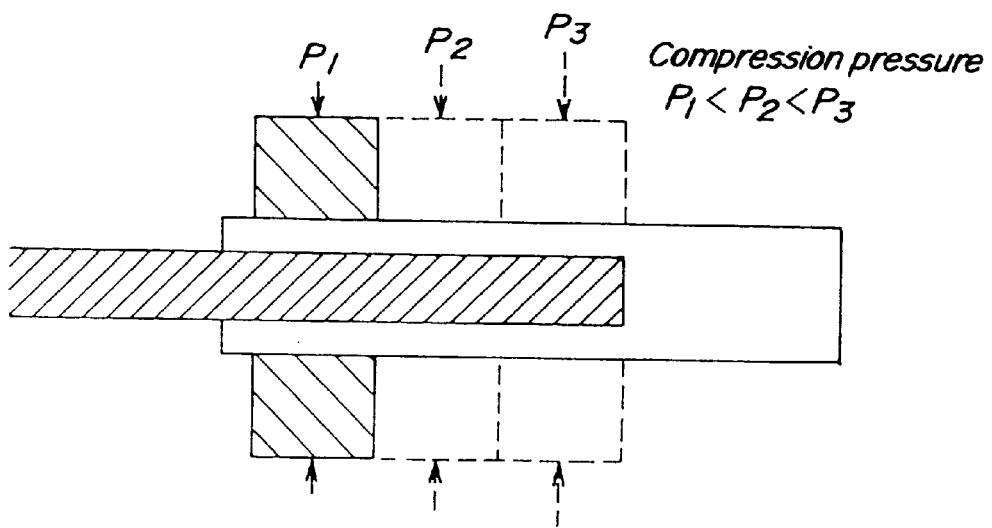
FIG. 4 is a schematic view for explaining still another embodiment of the securing method according to the invention.

FIGS. 3 to 5 are schematic views respectively showing another embodiment of the securing method according to the invention. In the embodiments shown in FIGS. 3 to 5, portions similar to those of FIG. 1 are denoted by the same reference numerals as those of FIG. 1, and the explanations thereof are omitted here. In the embodiment shown in FIG. 3, a compression of the overall compression portion L is performed in such a manner that a first compression pressure $P_1$, a second compression pressure $P_2$, and a third compression pressure $P_3$, are applied to the compression regions successively by means of the compression die 4 having a width a which is one third of the overall compression portion L to be compressed. In the embodiment shown in FIG. 3, all the compression pressures are equal so that a relation of $P_1=P_2=P_3$ is satisfied.

Moreover, in the embodiment shown in FIG. 4, as is the same as the embodiment shown in FIG. 3, a compression of the overall compression portion L is performed in such a manner that a compression pressure is applied at three times by means of the compression die 4 having a width a which is one third the overall compression portion L. A difference from the method of FIG. 2 is that a compression pressure to be applied is increased successively so that a relation of $P_1<P_2<P_3$ is satisfied. Further, in the embodiment shown in FIG. 5, as is the same as the embodiments shown in FIGS. 3 and 4, the compression die 4 has a width a which is one third of the overall compression portion L. And the difference of the embodiment depicted in FIG. 5 over those depicted in FIGS. 3 and 4 is that a first compression pressure $P_1$, a second compression pressure $P_2$, a third compression pressure $P_3$ and a fourth compression pressure $P_4$ are applied to the compression regions successively in such a manner that a part b of the respective compression regions is overlapped. In the embodiment shown in FIG. 5, a relation of $P1<P2<P3<=P4$ is satisfied.

In the securing methods shown in FIGS. 3 to 5, a relation, between the compression pressure $P_3$ among the compression pressures $P_1$ to $P_4$ and a limit strength at which the metal member of the polymer insulator obtained by respective securing methods mentioned above is fractured, is measured together with the fracture mode at that time. The results are shown in FIG. 6. In FIG. 6, $P_s$ shows a limit compression pressure at which the polymer insulator is fractured at the "core slip-out" mode in the embodiment shown in FIG. 3 and $P_b$ shows a compression pressure at which the polymer insulator is fractured at the "core fracture" mode. Moreover, in the embodiment shown in FIG. 4, an example, in the case that $P_3=P_b$, $P_2=P_s$, and $P_1<P_2<P_3$ are satisfied, is shown. Further, in the embodiment shown in FIG. 5, an example, in the case that $P_3=P_4=P_b$, $P_2=P_s$, and $P_1<P_2<P_3=P_4$ are satisfied, is shown.

From the results shown in FIG. 6, if the results shown in FIG. 3 and the results shown in FIG. 4 are compared, it is understood that, even in the three time compression operation, the embodiment shown in FIG. 4 in which P1<P2<P3 is satisfied has an excellent tensile strength at the core slip-out mode higher than that of the embodiment shown in FIG. 3 in which $P_1=P_2=P_3$ is satisfied. From this result, it is understood that a compression pressure applied to the compression regions is increase successively when a plural compression operations are performed. Then, if the results shown in FIG. 4 and the results shown in FIG. 5 are compared, it is understood that the embodiment shown in FIG. 5 in which the number of the compression operation is increased and a plural compression operations are performed in an overlapped manner has an excellent compression strength at the core slip-out mode higher than that of the embodiment shown in FIG. 4 in which the number of the compression operation is small and a plural compression operations are performed in a no overlapped manner. From the results mentioned above, it is understood that it is preferable to perform the plural compression operations in an overlapped manner.

Generally, the connection is performed under a compression pressure in a region at which the fracture occurs in the "core slip-out" mode which ensure a stable quality for the insulator. However, in the preferable embodiments according to the invention, it is understood that a further excellent tensile strength can be obtained even if the second compression pressure or more other than the first compression pressure applied near the open end 2a of the metal end-fitting 2 is the same as the limit compression pressure Ps between the "core slip-out" mode and the "core fracture" mode or more.

It should be noted that, in the embodiments mentioned above according to the invention, a region of the "core slip-out" mode and a region of the "core fracture" mode are previously determined by preparing the polymer insulators having the same shape under various compression pressures and tensile strengths are measured, and the result is utilized.

As clearly understood from the explanation mentioned above, according to the invention, since a compression pressure is applied successively to the divided compression regions of the overall compression portion in the case of performing the connection in such a manner that the core and the metal member are compressed circumferentially by means of the compression die, an excellent securing strength (tensile strength) can be obtained as compared with the embodiment in which a compression pressure is applied only once.

What is claimed is:

1. A securing method including the steps of inserting a core into a depression portion of a metal member having an open end portion, and connecting said metal member to said core by compressing circumferentially said core and metal member by means of a compression die, comprising a step of compressing circumferentially said core and metal member so that an overall compression portion to be compressed by means of said compression die is divided into a plurality of circumferential compression regions arranged from said open end portion of said metal member to a closed end portion, and a circumferential compression pressure is applied to said circumferential compression regions successively from said open end portion to said closed end portion wherein compression pressures of at least one of a first compression operation and a first and second compression operations are set to a level lower than a limit compression pressure at which a fracture occurs in a core slip-out mode, and compression pressures of the second compression operation and a third or successive compression operations are set to at a level larger than said limit compression pressure.

2. The securing method according to claim 1, wherein a width of said circumferential compression regions of said metal member is set to a half or less of a length of said overall compression portion to be compressed.

3. The securing method according to claim 1, wherein the circumferential compression pressures applied to said circumferential compression regions are successively increased from said open end portion to said closed end portion of said overall compression portion to be compressed.

4. The securing method according to claim 1, wherein said compression regions are overlapped partially.

5. The securing method according to claim 1, wherein said core is an FRP rod of a polymer insulator, and said metal member is a metal end-fitting of said polymer insulator.

* * * * *

UNITED STATES PATENT AND TRADEMARK OFFICE
CERTIFICATE OF CORRRECTION

PATENT NO. : 5,907,898
DATED : June 1, 1999
INVENTOR(S) : Shigehiko Kunieda, et al.

It is certified that error appears in the above-identified patent and that said Letters Patent is hereby corrected as shown below:

On title page, item [56], insert the following:

U. S. PATENT DOCUMENTS

| EXAMINER INITIAL | PATENT NUMBER | ISSUE DATE | PATENTEE | CLASS | SUBCLASS | FILING DATE IF APPROPRIATE |
|---|---|---|---|---|---|---|
| | 3 8 2 4 6 6 5 | 07/23/1974 | Saito | | | |
| | 4 2 4 1 4 9 0 | 12/30/1980 | Edwards | | | |
| | | | | | | |

FOREIGN PATENT OR PUBLISHED FOREIGN PATENT APPLICATION

| | | DOCUMENT NUMBER | PUBLICATION DATE | COUNTRY OR PATENT OFFICE | CLASS | SUBCLASS | TRANSLATION YES | NO |
|---|---|---|---|---|---|---|---|---|
| | FR | 2 4 1 8 9 6 0 | 09/28/1979 | FRANCE | | | | |
| | EP | 0 8 4 1 1 0 8 A 1 | 05/13/1998 | EPO | | | | |

Signed and Sealed this

Second Day of November, 1999

Attest:

Q. TODD DICKINSON

*Attesting Officer*     *Acting Commissioner of Patents and Trademarks*